(12) United States Patent
Heath

(10) Patent No.: US 10,173,144 B2
(45) Date of Patent: Jan. 8, 2019

(54) LIFT SYSTEM WITH MOVING CAM ASSEMBLY AND RELATED METHODS

(71) Applicant: James Heath, Seattle, WA (US)

(72) Inventor: James Heath, Seattle, WA (US)

( * ) Notice: Subject to any disclaimer, the term of this patent is extended or adjusted under 35 U.S.C. 154(b) by 234 days.

(21) Appl. No.: 15/298,058

(22) Filed: Oct. 19, 2016

(65) Prior Publication Data

US 2018/0104615 A1 Apr. 19, 2018

(51) Int. Cl.
| | | |
|---|---|---|
| *F16D 63/00* | (2006.01) | |
| *A63J 1/02* | (2006.01) | |
| *B66D 3/06* | (2006.01) | |
| *F16D 125/28* | (2012.01) | |

(52) U.S. Cl.
CPC ............... *A63J 1/028* (2013.01); *B66D 3/06* (2013.01); *F16D 63/008* (2013.01); *F16D 2125/28* (2013.01)

(58) Field of Classification Search
CPC ... A63J 1/028; B66D 3/02; B66D 3/06; F16D 63/008; F16D 2125/28
See application file for complete search history.

(56) References Cited

U.S. PATENT DOCUMENTS

| | | | | |
|---|---|---|---|---|
| 1,026,118 | A * | 5/1912 | Pearson | A61G 19/00 188/171 |
| 1,412,921 | A * | 4/1922 | Chapman | C10J 3/32 110/275 |
| 5,492,236 | A | 2/1996 | Foy | |
| 6,216,826 | B1 * | 4/2001 | Botzet | B60T 1/067 187/375 |
| 6,729,605 | B2 * | 5/2004 | Brackman | A63J 1/028 254/283 |
| 8,636,265 | B1 | 1/2014 | Soot | |
| 8,684,854 | B2 | 4/2014 | Fisher | |
| 2003/0089551 | A1 * | 5/2003 | Kato | B66B 7/06 182/1 |
| 2007/0227830 | A1 | 10/2007 | Svitavsky et al. | |
| 2008/0223665 | A1 * | 9/2008 | O'Donnell | B66B 7/062 187/256 |
| 2012/0138391 | A1 * | 6/2012 | Weinberger | B66B 5/0025 187/251 |
| 2013/0001020 | A1 | 1/2013 | Kigawa et al. | |
| 2014/0054115 | A1 * | 2/2014 | Becker | B66B 9/025 187/252 |
| 2014/0182976 | A1 | 7/2014 | Valjus et al. | |
| 2015/0021010 | A1 * | 1/2015 | Chaika | F04B 47/14 166/68 |
| 2016/0243458 | A1 * | 8/2016 | Heath | F16D 63/008 |

FOREIGN PATENT DOCUMENTS

| | | |
|---|---|---|
| EP | 1181963 A1 | 2/2002 |
| JP | 3051214 U | 8/1998 |
| WO | 2014075954 A1 | 5/2014 |

* cited by examiner

*Primary Examiner* — Emmanuel M Marcelo
(74) *Attorney, Agent, or Firm* — TraskBritt

(57) ABSTRACT

A lift system for lifting a load includes a counterweight, a base unit, a fly line, a load line, and pulleys. The base unit includes a movable cam assembly coupled to a fixed frame. The cam assembly includes a cam member that is rotatable relative to a carriage of the cam assembly. The cam assembly can be moved between first and second positions relative to the frame member, and prevents movement of the fly line through the base unit in the first position, while movement of the fly line through the base unit is allowed when the cam assembly is in the second position.

20 Claims, 10 Drawing Sheets

LIFT SYSTEM WITH MOVING CAM ASSEMBLY AND RELATED METHODS

CROSS-REFERENCE TO RELATED APPLICATION

The subject matter of this application is related to the subject matter of U.S. patent application Ser. No. 14/631,094, filed Feb. 25, 2015 in the name of James Heath, the contents of which are incorporated herein in their entirety by this reference.

FIELD

Embodiments of the present disclosure relate generally to lifting systems and methods, such as portable lifting systems that may be temporarily installed in, for example, a theater.

BACKGROUND

Rigging or lifting systems are used in theaters to raise and lower objects on and off stage. For example, scenery backdrops may be raised and lowered by a system of ropes, cables, pulleys, tracks, weights, motors, etc. For example, a rope or cable may be secured to a motorized winch assembly, around one or more pulleys attached to a frame above and/or around the stage, and connected to an object to be lifted (e.g., scenery, curtains, props, an actor, etc.). Some systems may be manually operated, in which ropes are raised and lowered by stage hands, and tied off when not being used to raise or lower loads.

Particular attention should be paid to safety of theatrical lifting systems because a falling load can lead to injuries or loss of life. Safety while lifting humans (e.g., actors) is especially important. During performances, it is sometimes desirable to raise and lower actors, such as to create the illusion of flying. Lifting systems for such applications should be easy to operate and be fast enough to create the desired visual effect when moving the actor.

Some productions are performed at various theaters around the country or the world. Crew typically pack and ship nearly everything needed for a particular show, relying on each location to have only the most basic facilities, such as a stage, overhead supports, lights, curtains, etc. Producers of traveling productions therefore may tend to choose props, costumes, etc., that are lightweight and can be packed into relatively smaller space than productions that are not expected to travel. Producers may also choose to modify scripts to avoid the need to carry some equipment or to avoid the need for facilities or equipment that will not be available. For example, if adequate facilities for lifting actors are not expected to be available, a producer may modify or remove a flying scene to avoid the need to lift an actor.

BRIEF SUMMARY

In some embodiments of the present disclosure, a lift system includes an overhead support comprising at least a first pulley and a second pulley, a counterweight comprising at least an upper pulley, a base unit, a fly line, and a load line. The load line passes around the first pulley of the overhead support and is connected to a load having a weight on one side of the first pulley. The load line is connected to the counterweight on another side of the first pulley.

The base unit has a fixed frame including an anvil surface. The base unit also includes a first guide member and a second guide member each coupled to the fixed frame for guiding movement of the fly line. The base unit further includes a cam assembly coupled to the fixed frame. The cam assembly is movable relative to the fixed frame between a first position and a second position. The cam assembly includes a cam carriage and a cam member. The cam member is rotatable relative to the cam carriage.

The fly line has a first fixed point and a second fixed point. A working portion of the fly line between the first fixed point and the second fixed point extends around the upper pulley of the counterweight and around the second pulley of the overhead support. A first section of the working portion of the fly line on a first side of the second pulley of the overhead support suspends the counterweight above ground. A second section of the working portion of the fly line on a second side of the second pulley of the overhead support extends through the base unit between the first guide member and the second guide member and adjacent the cam assembly.

The cam member abuts against the fly line when the cam assembly is in the first position such that the fly line is wedged between the cam member and the anvil surface responsive to movement of the fly line in each of two opposite directions, and the fly line is thus prevented from traveling through the base unit. The fly line may be freely pulled in each of the two opposite directions and caused to travel through the base unit by an operator to change an elevation of the counterweight above ground and a corresponding position of the load when the cam assembly is in the second position.

Additional embodiments include methods of installing a lift system. For example, a load line may be passed around a first pulley of an overhead support. The load line may be connected to a load having a weight on one side of the first pulley and connected to a counterweight on another side of the first pulley. A fly line may be passed around an upper pulley attached to the counterweight, around a second pulley of the overhead support, and through a base unit.

The base unit may comprise a fixed frame having an anvil surface, a first guide member and a second guide member each coupled to the fixed frame, and a cam assembly coupled to the fixed frame. The cam assembly may be movable relative to the fixed frame between a first position and a second position, and may include a cam carriage and a cam member. The cam member may be rotatable relative to the cam carriage.

A first point and a second point of the fly line may be fixed in respective fixed locations so as to define a working portion of the fly line between the first point and the second point. A first section of the working portion of the fly line may be disposed on a first side of the second pulley of the overhead support and may suspend the counterweight above ground. A second section of the working portion of the fly line may be disposed on a second side of the second pulley of the overhead support and may extend through the base unit between the first guide member and the second guide member and adjacent the cam assembly. The cam member of the base unit may abut against the fly line when the cam assembly is in the first position such that the fly line is wedged between the cam member and the anvil surface responsive to movement of the fly line in each of two opposite directions and prevented from traveling through the base unit. The fly line may be freely pulled in each of the two opposite directions and caused to travel through the base unit by an operator to change an elevation of the counterweight above ground and a corresponding position of the load when the cam assembly is in the second position.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments when read in conjunction with the accompanying drawings, in which:

DETAILED DESCRIPTION

The illustrations presented herein are not actual views of any particular lift system or component thereof, but are merely idealized representations that are employed to describe example embodiments of the present disclosure. Additionally, elements common between figures may retain the same numerical designation.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and accompanying drawings and do not connote or depend on any specific preference, orientation, or order, except where the context clearly indicates otherwise.

As used herein, the term "substantially," in reference to a given parameter, property, or condition, means to a degree that one of ordinary skill in the art would understand that the given parameter, property, or condition is met with a small degree of variance, such as within acceptable manufacturing tolerances.

As used herein, the term "location" in reference to a lift system or components thereof means a place where a lift system is used or installed, encompassing the volume within the operating limits of the lift system as installed. Though some parts of the lift system move during use of the lift system, the system itself is considered to be at a location bounded by the outer extent of positions in which components of the lift system may be without disconnecting such components of the lift system.

A lift system according to the present disclosure may include an overhead support, a counterweight, a base unit, a fly line, and a load line. The overhead support, the counterweight, and the base unit each include pulleys to guide the lines in the system. The base unit may also include a brake to stop the lines from moving. The fly line is fixed in place at two locations along the fly line (e.g., at ends of the fly line), and the fly line passes around an upper pulley of the counterweight, around at least one pulley of the overhead support, around at least one pulley of the base unit, and around a lower pulley of the counterweight. The load line is connected to the counterweight and a load, passing around a pulley of the overhead support. In operation, a change in elevation of the counterweight corresponds to a change in position (typically elevation) of the load. The counterweight may be selected to have approximately the same mass as the load, such that an operator need not expend excessive effort to raise or lower the load. The load may be a person or an object, for example.

Figure 1A:
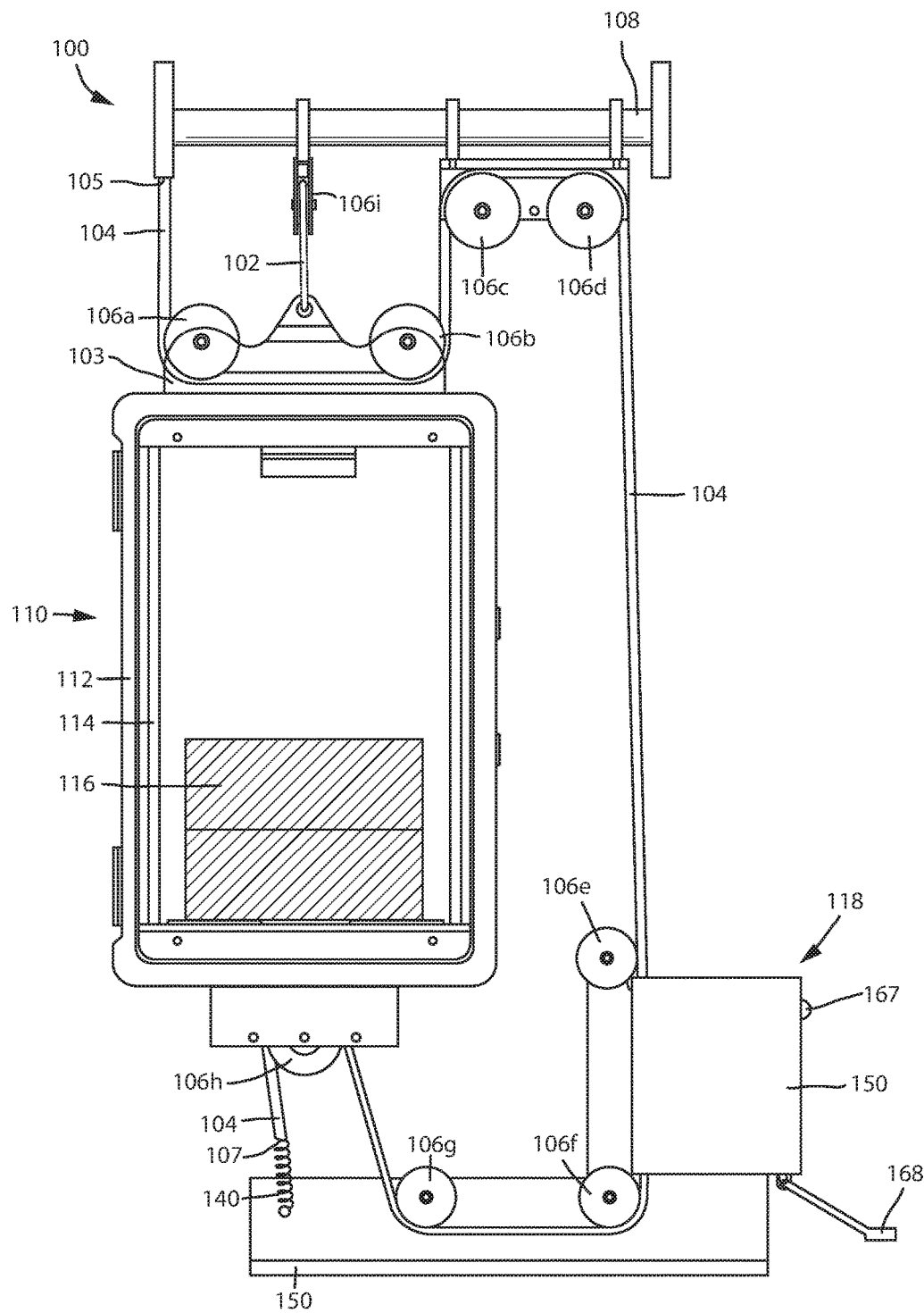
FIGS. 1A and 1B are simplified cross-sectional side views illustrating an embodiment of a lift system according to the present disclosure.

FIG. 1A illustrates a simplified view of a lift system 100. The lift system 100 includes a load line 102 that may be configured to raise and lower a load 111 (see FIG. 1B). A fly line 104 (which may be referred to in the art as a "purchase line," "operating line," or "hand line") routed around pulleys 106a, 106b, etc. (collectively referred to as pulleys 106), and secured to an overhead support 108, is configured to move a counterweight 110 vertically and therefore move the load 111 attached to the load line 102. The fly line 104 has a first fixed point and a second fixed point. For example, as shown in FIG. 1A, one end 105 of the fly line 104 may be secured to the overhead support 108, and an opposite end 107 of the fly line 104 may be secured to a base unit 118. A working portion of the fly line 104 is defined between the first fixed point and the second fixed point. The fly line 104 is routed around pulleys 106a, 106b (which may be secured to a bracket 103 or to a part of the counterweight 110), pulleys 106c, 106d (which may be secured to or part of the overhead support 108), pulleys 106e, 106f, and 106g (which may be secured to or part of the base unit 118), and pulley 106h (which may be secured to or a part of the counterweight 110). In some embodiments, the bracket 103 may be part of a yoke assembly as described in further detail hereinbelow with reference to FIGS. 12A and 12B. Thus, a first section of the working portion of the fly line on a first side of the pulleys 106c, 106d of the overhead support 108 suspends the counterweight 110 above ground, and a second section of the working portion of the fly line 104 on a second side of the pulleys 106c, 106d of the overhead support 108 extends through the base unit 118 between the pulleys 106e, 106f, 106g. An operator may pull the fly line 104 one direction or the other (up or down from the perspective of FIG. 1A) to move the counterweight 110 upward or downward.

Figure 1B:
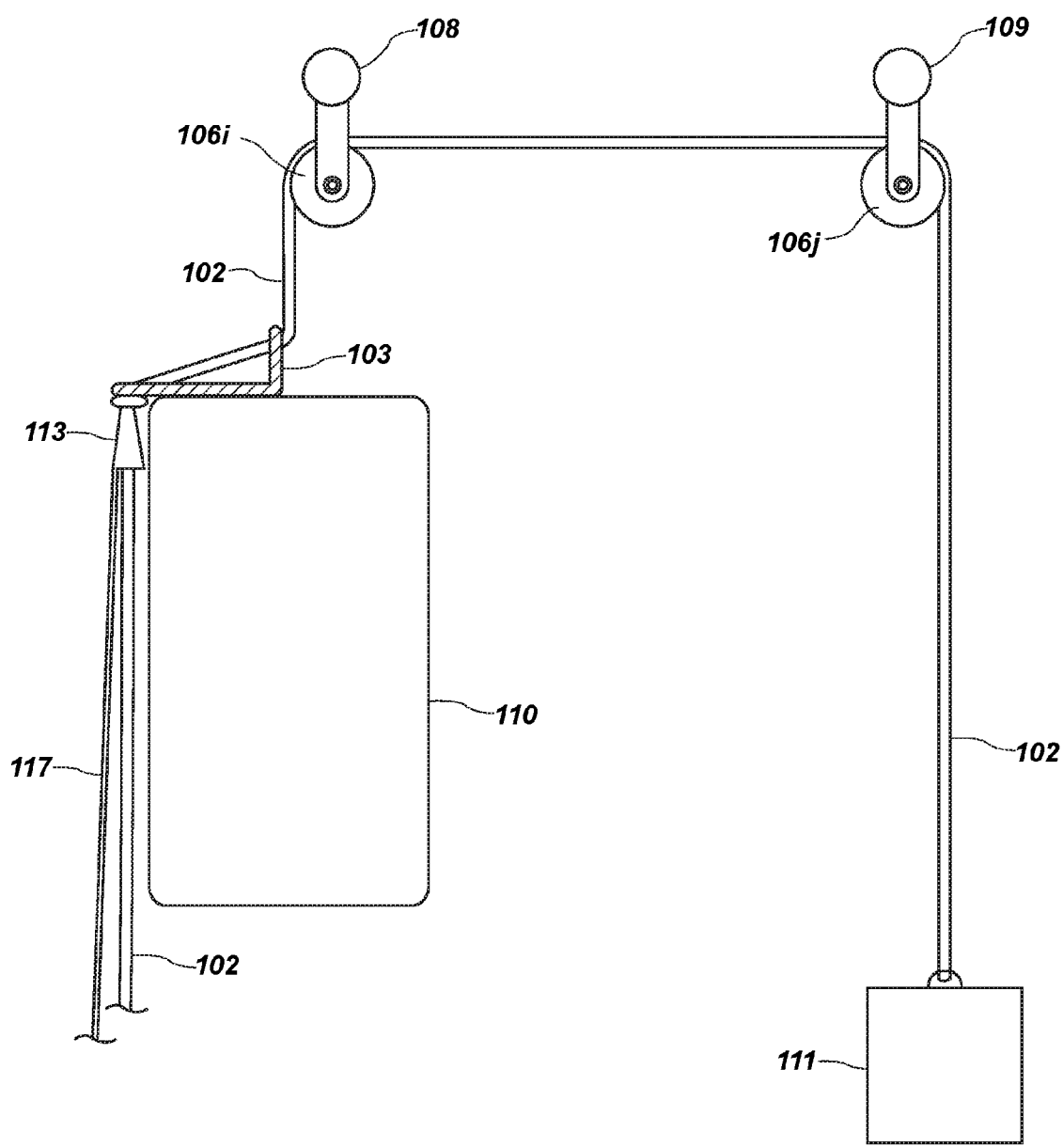

A portion of the lift system 100 is shown in FIG. 1B. In particular, FIG. 1B illustrates the load line 102, which connects the counterweight 110 to the load 111. The fly line 104 and its associated pulleys 106 are omitted from FIG. 1B for clarity. The load line 102, passes over pulley 106i (and optionally one or more additional pulleys 106j, such as may be secured to another overhead support 109) moves the load 111 in response to movement of the counterweight 110. Thus, the load line 102 passes around the pulleys 106i, 106j of the overhead supports 108, 109, and is connected to the load 111, which has a weight, on one side of the pulleys 106i, 106j. The load line 102 is connected to the counterweight 110 on another side of the pulleys 106i, 106j.

The overhead supports 108, 109 may be built into or otherwise be a part of a theater structure. For example, stages are typically equipped with head blocks used to support curtains, hoists, etc. The overhead supports 108, 109 may also be or include structural building components, such as roof beams. The overhead supports 108, 109 should be robust enough to support the weight of the suspended components of the lift system 100 and the weight of the load 111. The overhead supports 108, 109 may include various pulleys, rails, hooks, ropes, and other cables, which devices may be independent of the lift system 100 described herein, or which may be used to support components of the lift system 100.

The lift system 100 may further include a line stopper 113 configured to limit the distance the load line 102 can travel, as disclosed in the aforementioned U.S. patent application Ser. No. 14/631,094. The line stopper 113 may control the length of load line 102 between the counterweight 110 and the load 111. The line stopper 113 may be used to adjust the position of the load 111 with respect to the counterweight 110. In some embodiments, the line stopper 113 may be movable along the length of the load line 102.

Figure 7:
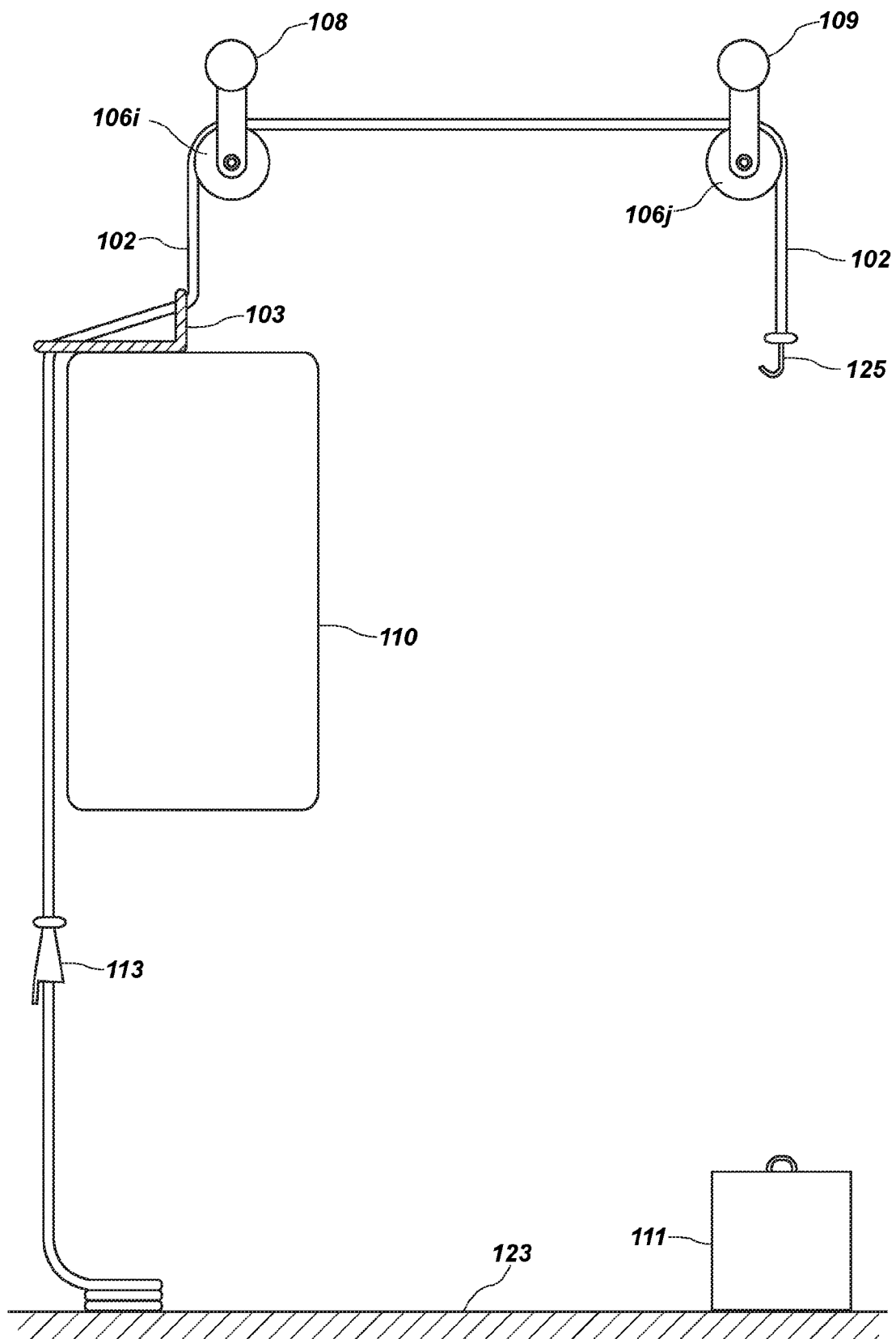
FIGS. 7 through 9 are simplified cross-sectional side views illustrating use of a line stopper of the lift system of FIGS. 1A and 1B.
Figure 8:
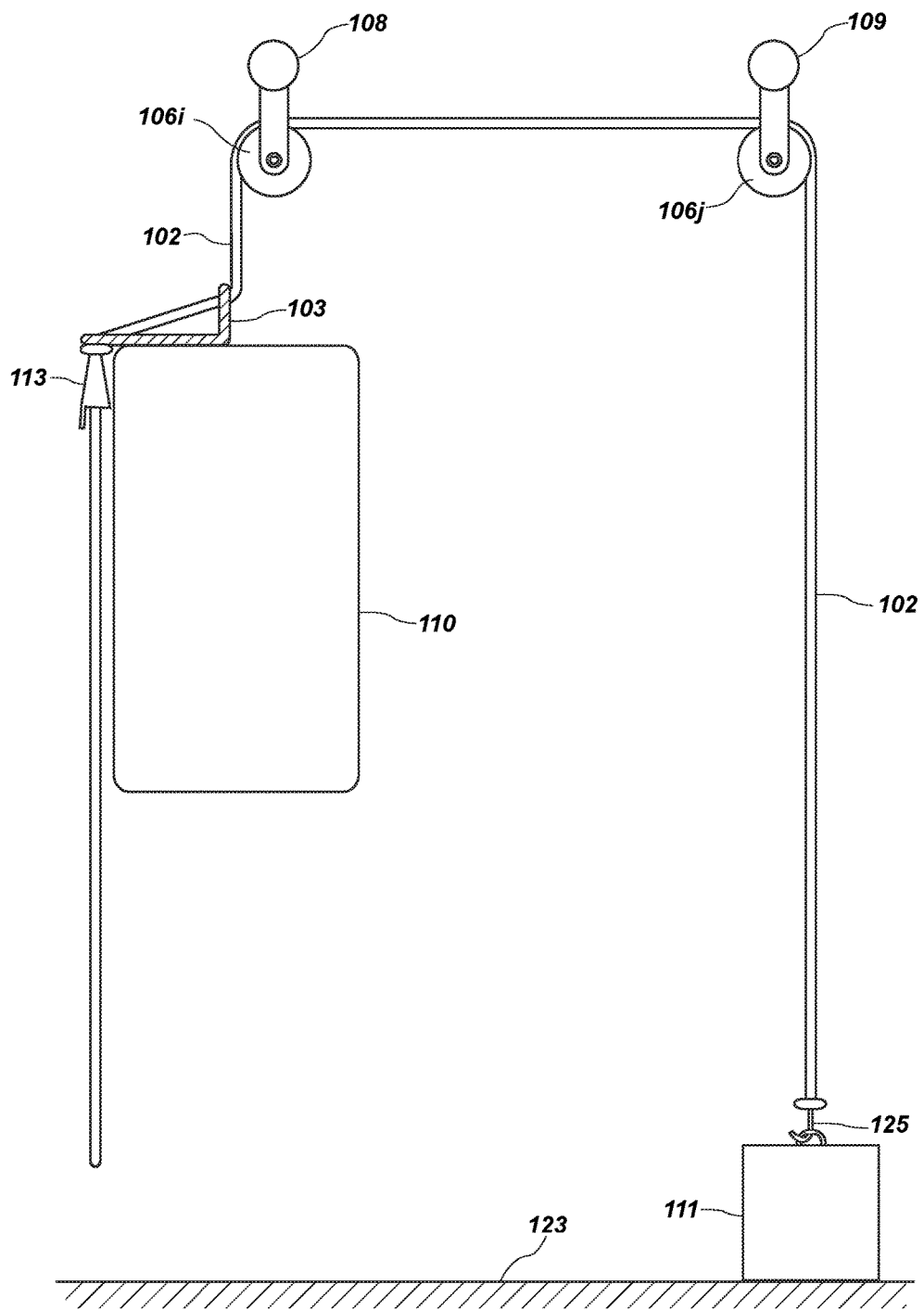
Figure 9:
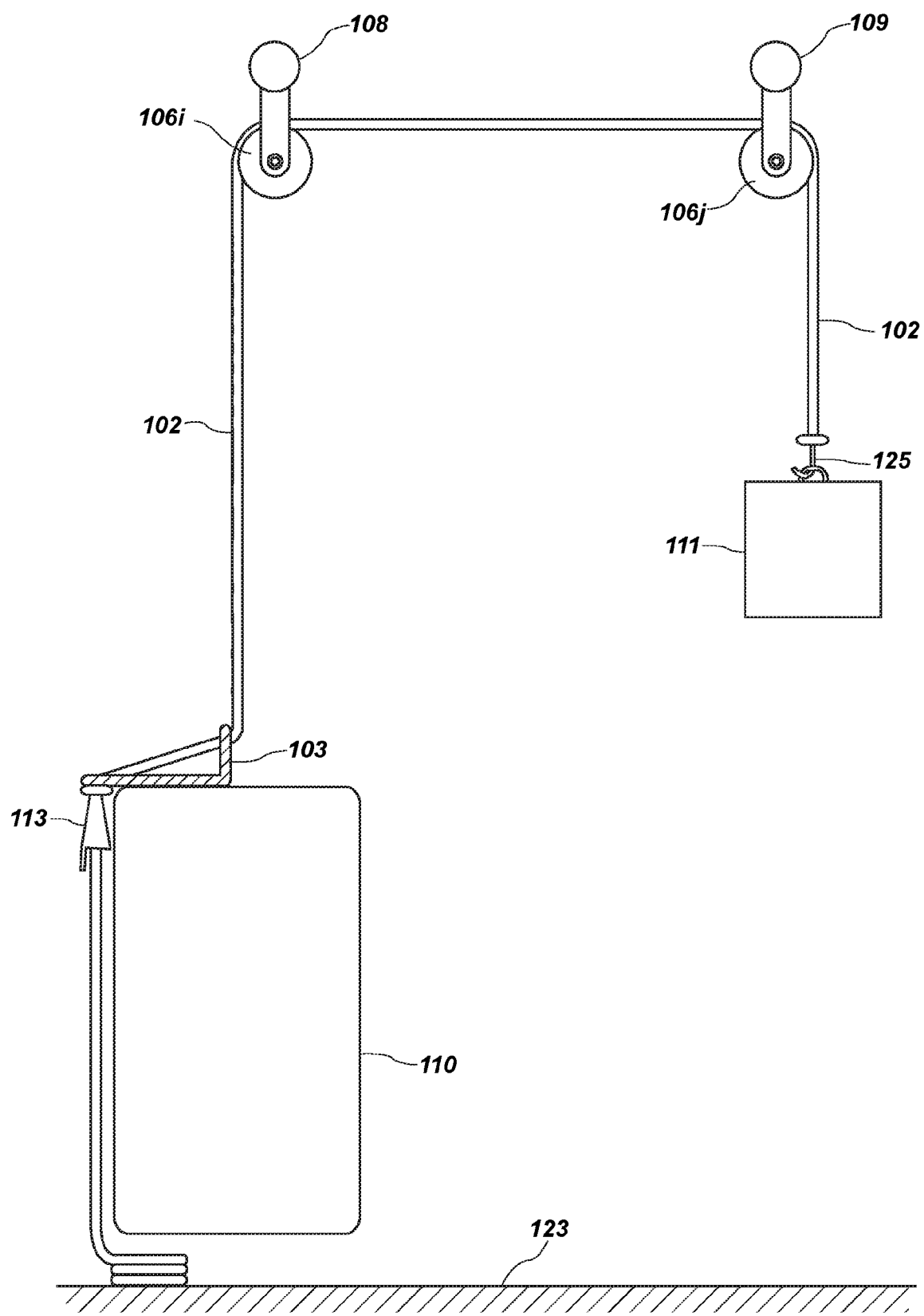

The line stopper 113 may be used as a termination or attachment of the load line 102 to the counterweight 110, as shown in FIGS. 7 through 9. As shown in FIG. 7, the load 111 may initially rest on the floor 123, and the line stopper 113 may be secured to a portion of the load line 102 away from the counterweight 110. The counterweight 110 may be held in place by the fly line 104 and its associated pulleys 106 (not shown in FIGS. 7 through 9; see FIG. 1A). The load line 102 may include an attachment member 125, such as a carabiner, hook, or other means for securing the load 111 to be lifted. The attachment member 125 may be allowed to lower, which raises the line stopper 113, such as until the line stopper 113 contacts the bracket 103. The attachment member 125 may then be secured to the load 111, as shown in FIG. 8. With the line stopper 113 in contact with the bracket 103, movement of the counterweight 110 may cause an equal and opposite movement of the load 111. For example, FIG. 9 illustrates that the counterweight 110 has moved downward while the load 111 has been raised above the floor 123.

Referring again to FIG. 1A, the counterweight 110 may include a container 112, such as a polymeric box, to which the pulleys 106a, 106b, 106g may be secured. Polymeric boxes are typically used in the art of theatrical productions to store and transport equipment, props, costumes, etc., from one venue to another, and may be referred to as "road cases." A frame 114 may be attached to or within the container 112 to provide additional strength and anchor points to handle the stresses associated with use as a counterweight 110. For example, the frame 114 may include metal plates to which pulleys 106a and 106b, or pulley 106g may be attached to spread loads applied by the fly line 104 over a larger area of the container 112. The frame 114 may also include beams, rods, angle iron, etc., to provide further support. The frame 114 may include materials such as aluminum, steel, or other metals or alloys, as well as any other material having appropriate physical properties, such as plastics or composites. The frame 114 is shown as inside the container 112, but all or a portion of the frame 114 may be outside the container 112 in additional embodiments. The container may include holes through which pulleys 106a, 106b, 106h may be attached to the frame 114 (e.g., by bolts or other means). The pulleys 106a, 106b, 106h are illustrated on the outside of the container 112, but one or more of the pulleys 106a, 106b, 106h may be mounted within the container 112 so long as appropriate holes are provided to route the fly line 104. Mounting one or more of the pulleys 106a, 106b, 106h within the container 112 may limit the volume of the container 112 that can be used for storage and transport of materials, particularly if the pulleys 106a, 106b, 106h have relatively large diameters. However, interior mounting of the pulleys 106a, 106b, 106h may eliminate the need to connect the pulleys 106a, 106b, 106h to the container 112 or disconnect the pulleys 106a, 106b, 106h from the container 112.

Removable weights 116 may be placed within the container 112 to make the mass of the counterweight 110 comparable to the mass of the load 111 to be lifted. The number or size of the removable weights 116 may vary based on the mass of the load 111, and may be adjusted from time to time. In some embodiments, the removable weights 116 may be in the form of blocks or bags of relatively uniform mass (e.g., sand bags, concrete mix, concrete blocks, bricks, containers of water, etc.). The removable weights 116 may include a material that is readily available on location where the lift system 100 is installed, such that the removable weights 116 need not be transported with the other components of the lift system 100. The container 112 may have a removable cover or lid, such that the removable weights 116 may be added or removed as needed. By matching the mass of the counterweight 110 to the mass of the load 111, a relatively small force on the fly line 104 may raise and lower the load 111.

The base unit 118 may include pulleys or other rope guide members and a brake, and may be temporarily or permanently secured to the floor. In some embodiments, the base unit 118 may be mechanically secured to the floor or to an object, such as by bolts. For example, the base unit 118 may be bolted to a board, pallet, or other object, which may in turn be weighted down by sand bags, concrete mix, concrete blocks, bricks, containers of water, etc.

FIGS. 2 through 6 illustrate the base unit 118 in greater detail. The base unit 118 may include a stationary fixed frame 150 and a cam assembly 160. The pulleys 106e, 106f, 106g (or other line guide members) may be connected to the fixed frame 150. The cam assembly 160 and fixed frame 150 provide a line brake for the fly line 104.

The fixed frame 150 has an anvil surface 152 adjacent to which the fly line extends during operation of the lift system 100. The first pulley 106e and the second pulley 106f are each coupled to the fixed frame 150 for guiding movement of the fly line 104 adjacent the anvil surface 152 of the fixed frame 150.

Figure 4:
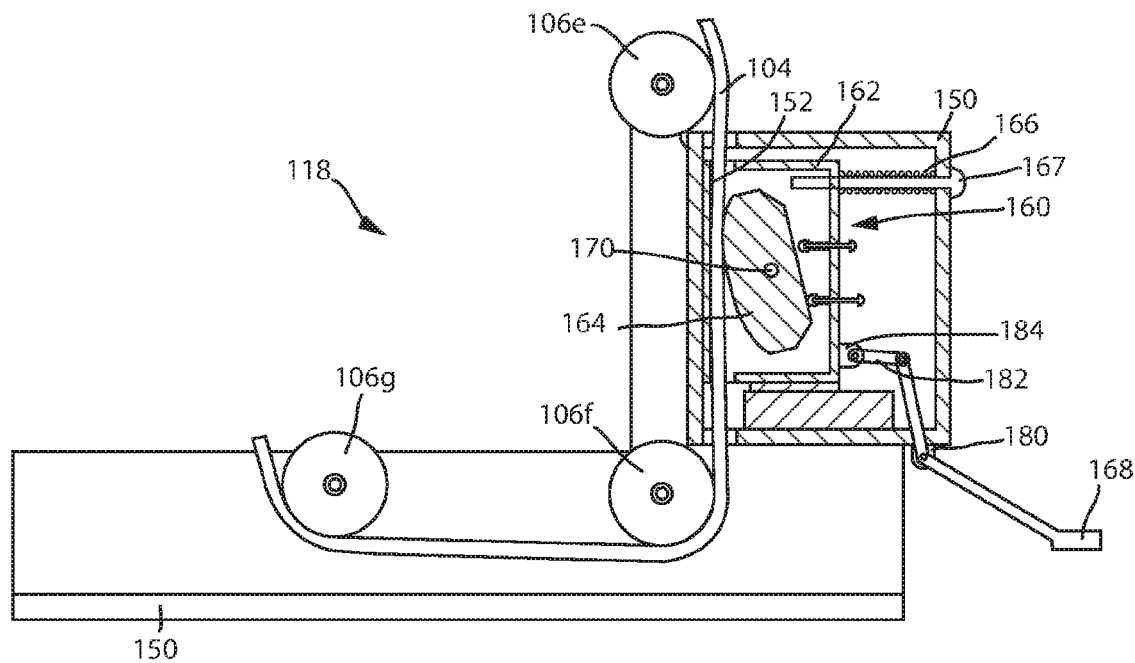
Figure 5:
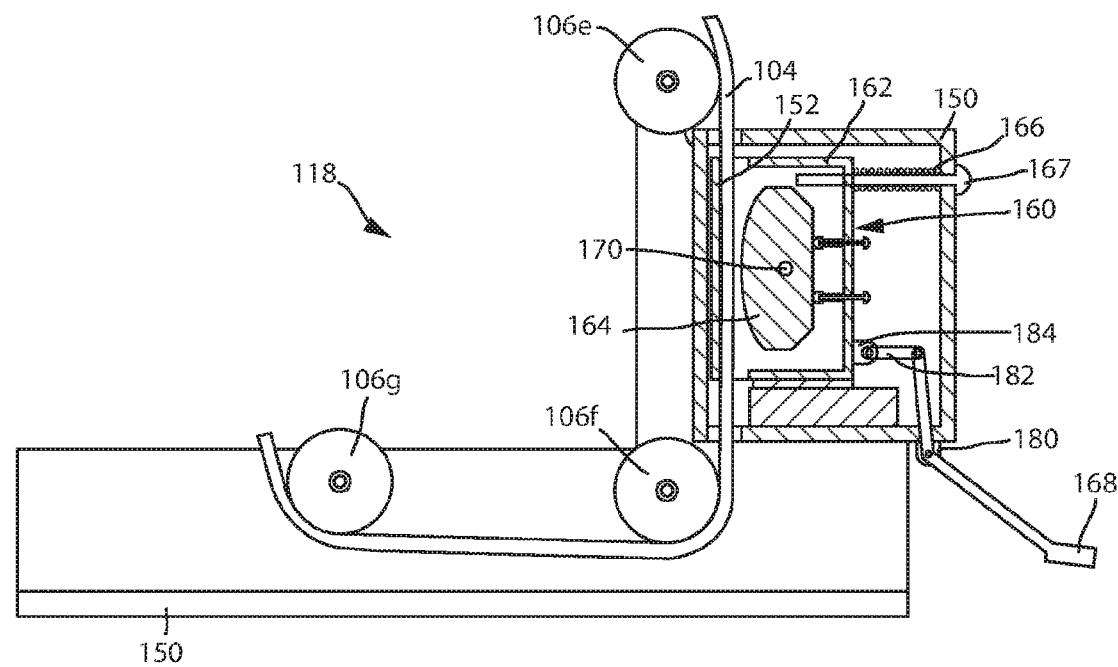
Figure 6:
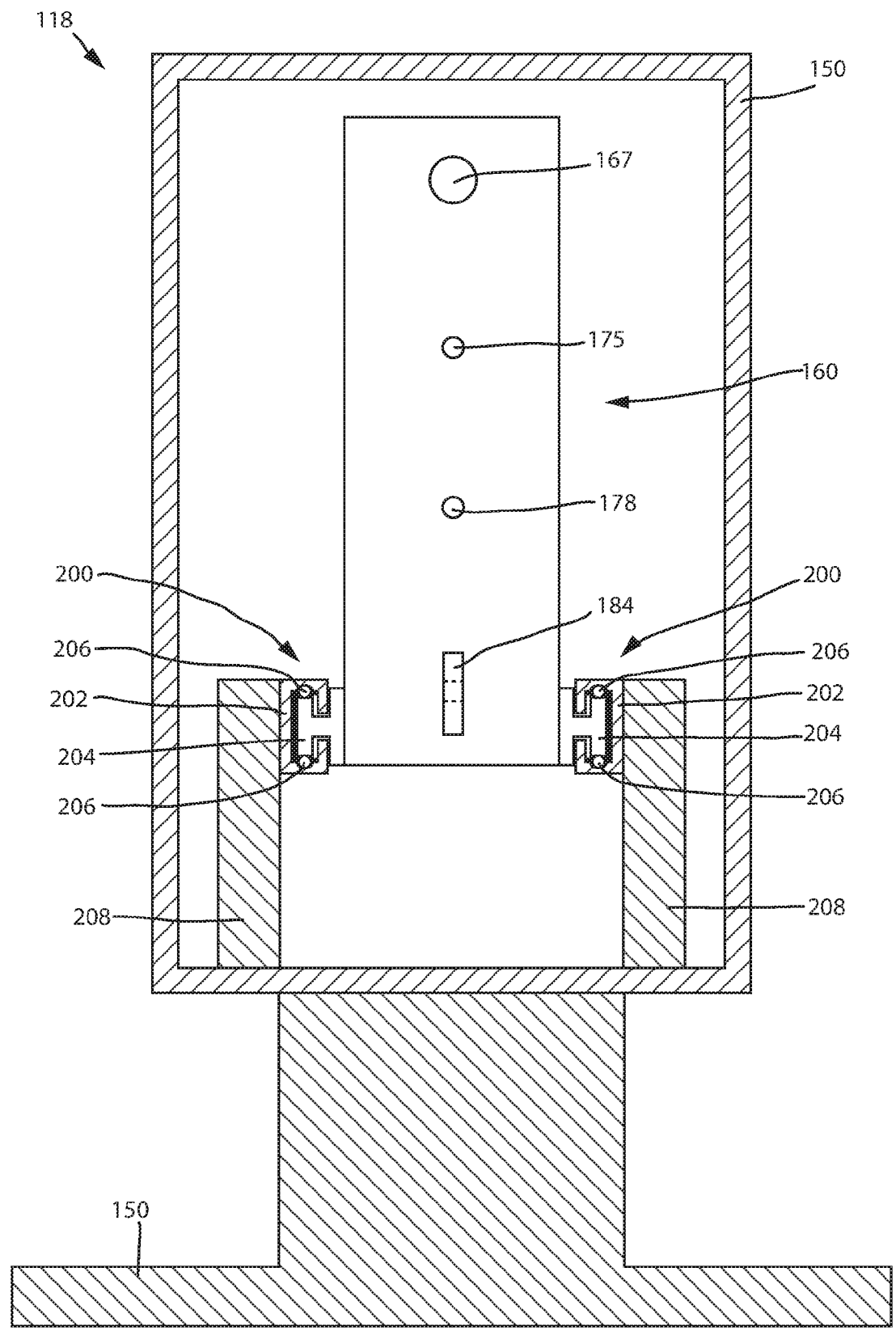
FIG. 6 is a simplified cross-sectional side view of base unit of FIGS. 2 through 5 from a perspective perpendicular to the perspective of the views of FIGS. 2 through 5.

The cam assembly 160 is coupled to the fixed frame 150, and is movable relative to the fixed frame 150 between a first position (shown in FIGS. 2 through 4) and a second position (shown in FIG. 5). For example, as shown in FIG. 6, the cam assembly 160 may be mounted to the fixed frame 150 by way of one or more track and rail assemblies 200. Each of the track and rail assemblies 200 may include, for example, a track 202 mounted to the fixed frame 150 by frame members 208, and a rail 204 mounted to the cam carriage 162 of the cam assembly 160. The rail 204 may be configured to slide within the track 202 in the direction perpendicular to the anvil surface 152 (FIGS. 2-5) of the fixed frame 150 (i.e., into and out from the plane of FIG. 6 and in the horizontal direction of FIGS. 2 through 5). In some embodiments, each track and rail assembly 200 may include bearings 206 (e.g., ball or roller bearings) disposed between the track 202 and rail 204 so as to reduce friction therebetween and facilitate relative movement between the track 202 and rail 204. The bearings 206 may be held in place by a bearing race.

Referring again to FIGS. 2 through 5, the base unit 118 may include a spring 166 located and configured to bias the cam assembly 160 toward the first position illustrated in FIGS. 2 through 4. The spring 166 may comprise, for example, a coiled spring disposed on and circling a guide rod 167. The guide rod 167 may extend through an aperture in the fixed frame 150 and through an aperture in the cam carriage 162. The coiled spring may be disposed on a section of the guide rod 167 extending between the fixed frame 150 and the cam carriage 162. Thus, the spring 166 urges the cam assembly 160 and the cam member 164 toward the anvil surface 152 of the fixed frame 150.

Figure 2:
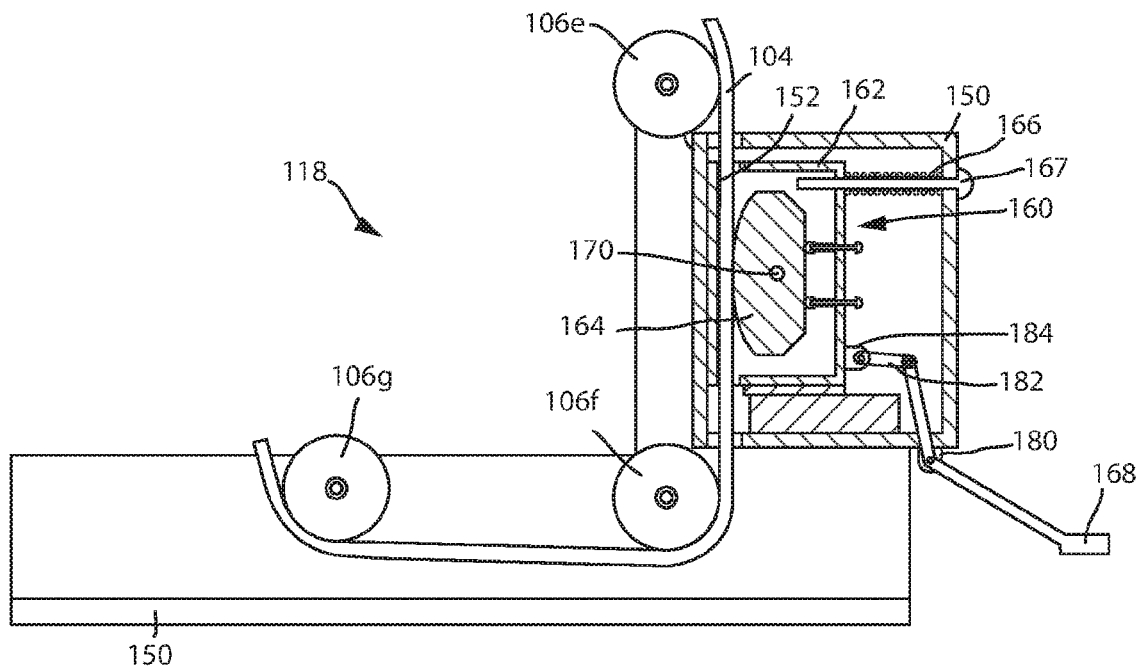
FIGS. 2 through 5 are simplified cross-sectional side views of a base unit including a line brake of the lift system shown in FIGS. 1A and 1B.
Figure 3:
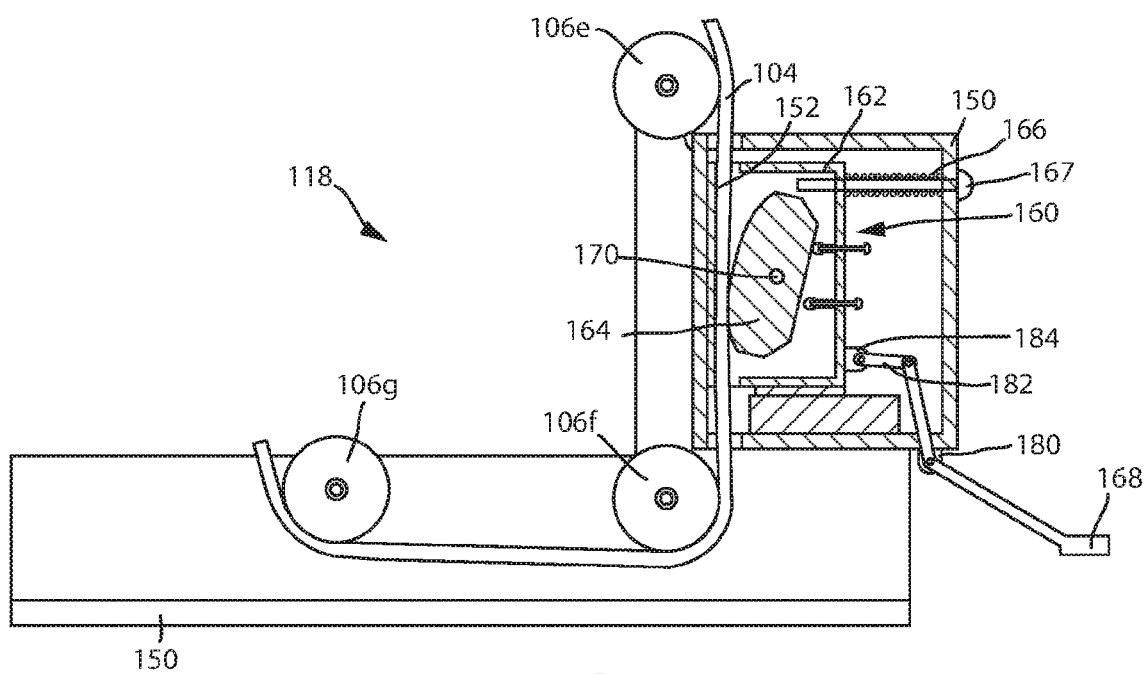

The base unit 118 may include a movable lever 168 that may be used to move the cam assembly 160 from the first position shown in FIGS. 2 through 4 to the second position shown in FIG. 5. In some embodiments, the movable lever 168 may comprise a foot pedal that may be operated with the foot of a person operating the fly line 104 of the lift system 100. The movable lever 168 may be attached to a bracket 180 on the fixed frame 150. The movable lever 168 may be configured to pivot relative to the fixed frame at the bracket 180. An end of the movable lever 168 may be coupled to a bracket 184 on the cam carriage 162 by a linkage member 182, as shown in FIGS. 2 through 5. Thus, actuating the movable lever 168 and causing the movable lever 168 to pivot at the bracket 180 from the position shown in FIGS. 2 through 4 to the position shown in FIG. 5 will pull the cam assembly 160 away from the anvil surface 152 along the track and rail assemblies 200 (FIG. 6) against the force of the spring 166. Upon release of the movable lever 168, the spring 166 will again urge the cam assembly 160 back toward the anvil surface 152.

It is noted that the path of the fly line 104 does not change in any substantial manner during operation of the cam assembly 160. In contrast, the path of the fly line 104 remains at least substantially constant, while the position of the cam assembly 160 is varied between the first position and the second position for activation and deactivation of the line brake on the fly line 104.

Figure 10:
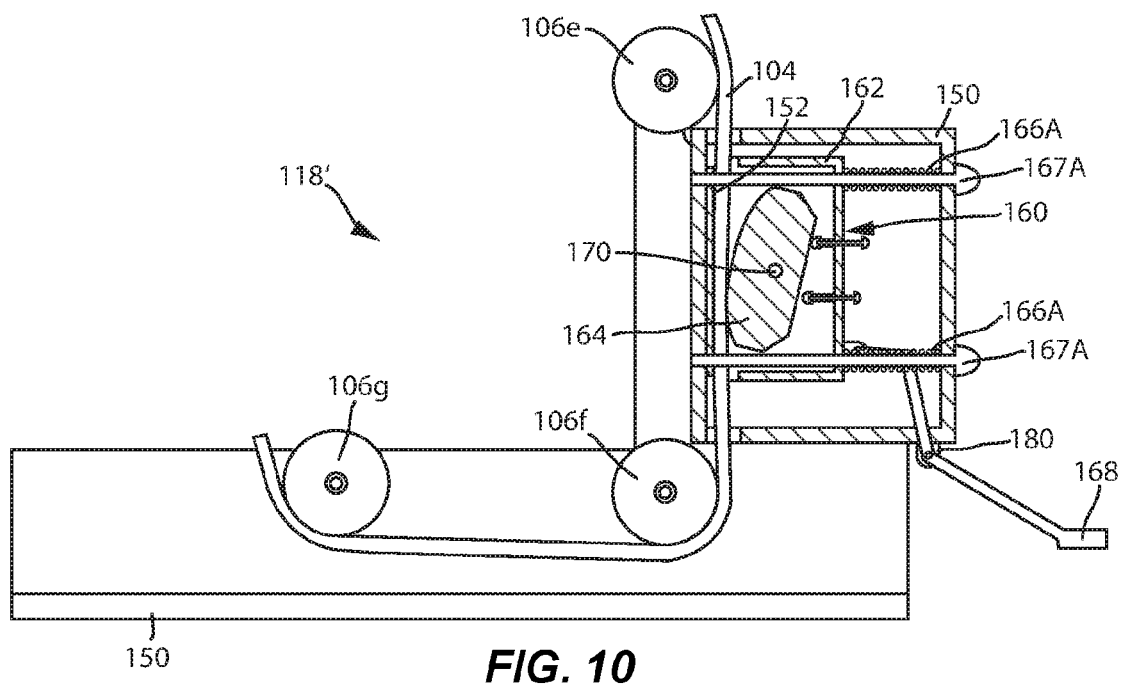
FIG. 10 is a simplified cross-sectional side view of another embodiment of a base unit including a line brake that may be employed in a lift system as shown in FIGS. 1A and 1B.

FIG. 10 illustrates an additional embodiment of a base unit 118' that may be employed in conjunction with the lift system 100 of FIGS. 1A and 1B. The base unit 118' is identical to that of FIGS. 2 through 5, with the exception that instead of using track and rail assemblies 200 as described with reference to FIG. 6, the base unit 118' using two or more guide rods 167A and 167B. The guide rods 167A and 167B are similar to the guide rod 167 of FIGS. 2 through 5, but extend entirely through the cam assembly 160 and are mounted at their opposing ends to the fixed frame 150. In this configuration, the cam assembly 160 simply travels along the guide rods 167A, 167B and is supported within the fixed frame 150 by the guide rods 167A, 167B. Springs 166A, 166B may be disposed on the guide rods 167A, 167B and configured to bias the cam assembly 160 toward the anvil surface 152 of the fixed frame 150 in the same manner as the spring 166 of FIGS. 2 through 5.

In additional embodiments, the cam assembly 160 may be configured to pivot and rotate relative to the fixed frame 150, instead of traveling linearly relative to the fixed frame 150. For example, a pin member may extend through the lower left region of the cam carriage 162 in the lower left region thereof (from the perspective of FIGS. 2 through 5). The pin member may be attached to and supported by the fixed frame 150 at the ends thereof, such that the cam carriage 162 can rotate about the pin member relative to the fixed frame 150 between first and second positions, wherein the cam member 164 abuts the fly line 104 in the first position but not in the second position when the cam member 164 is in the neutral position.

Figure 11:
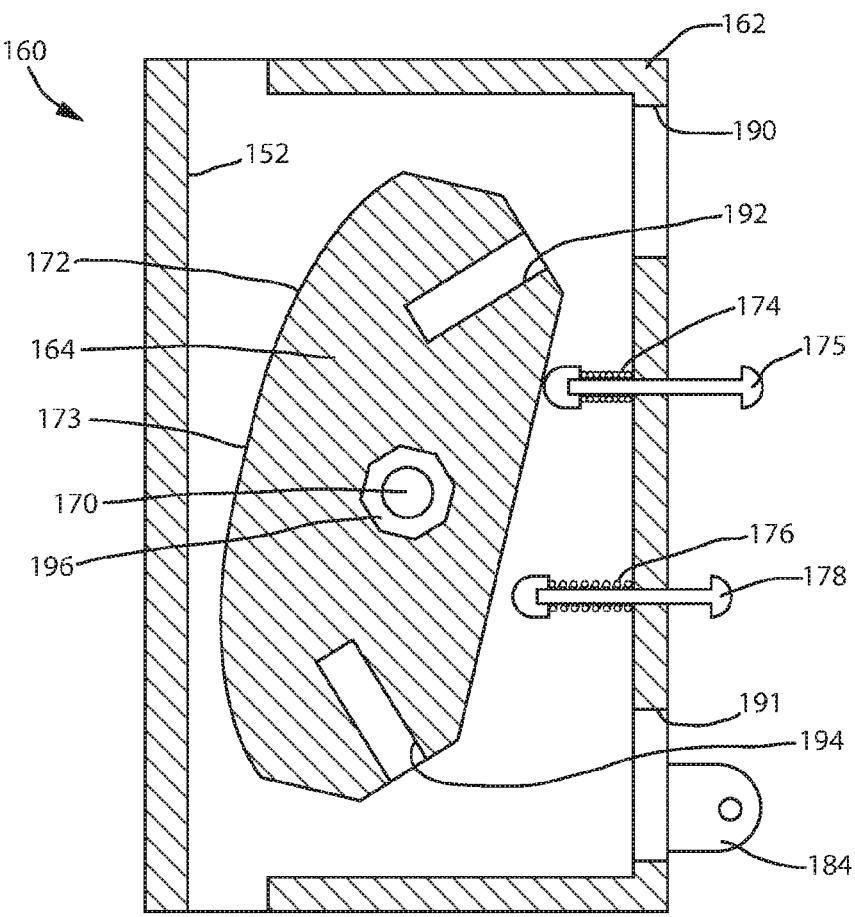
FIG. 11 is a simplified cross-sectional side view of an embodiment of a cam assembly that may be employed in a lift system as shown in FIGS. 1A and 1B.

The cam assembly 160 includes a cam carriage 162 and a cam member 164. The cam member 164 is rotatable relative to the cam carriage 162, as can be seen by comparing FIGS. 2, 3, and 4. FIG. 11 is an enlarged view of the cam assembly 160. As shown therein, the cam assembly 160 may be mounted on a pin 170. The ends of the pin member may be attached to and supported by the cam carriage 162. In this configuration, the cam member 164 may rotate on the pin 170 relative to the cam carriage 162 in the clockwise or counterclockwise directions as discussed in further detail below. The cam member 164 has a front line bearing surface 172 configured to bear against the fly line 104 (FIGS. 2 through 5) when the cam assembly 160 is in the first position shown in FIGS. 2 through 5.

As shown in FIG. 11, the line bearing surface 172 of the cam member is curved and has a point or section 173 at which a distance between the line bearing surface 172 and the center of the pin 170 is a minimum. The distance between the line bearing surface 172 and the center of the pin 170 increases in each of the opposite directions moving away from the point or section 173 at which the distance between the line bearing surface and the pin is the minimum, within the plane of rotation of the cam member 164.

The cam member 164 may be symmetrical about a plane extending longitudinally through the pin 170 and transversely through the cam member 164 and intersecting the point or section 173 of the line bearing surface 172 of the cam member 164 at which the distance between the line bearing surface 172 and the pin 170 is the minimum.

The cam assembly 160 may further include at least one spring member configured to bias the cam member 164 to a neutral position at which a line perpendicular to the anvil surface 152 of the fixed frame 150 (FIGS. 2 through 5) and extending through the pin 170 intersects the point or section 173 of the line bearing surface 172 of the cam member 164 at which the distance between the line bearing surface and the pin is the minimum. In other words, the cam assembly 160 may further include at least one spring member configured to bias the cam member 164 to the position shown in FIGS. 2 and 5, and away from the position shown in FIGS. 3 and 4.

For example, the cam assembly 160 may include a first spring member 174 and a second spring member 176 each configured to contact a rear surface 179 of the cam member 164 on a side of the cam member 164 opposite the front line bearing surface 172. The first spring member 174 and the second spring member 176 may be disposed on opposing sides of the pin 170, as shown in FIG. 11.

The springs 174, 176 may comprise, for example, coiled springs disposed on and circling respective guide rods 175, 178. The guide rods 175, 178 may extend through respective apertures in the cam carriage 162. The coiled springs 174, 176 may be disposed on sections of the guide rods 175, 178 extending between the cam carriage 162 and the cam member 164. Thus, when the cam member 164 is rotated in the clockwise direction (to the position shown in FIGS. 3 and 11), the first spring member 174 will urge the guide rod 175 to abut against the rear surface 179 of the cam member 164 at a point vertically above the pin 170 so as to urge rotation of the cam member 164 back toward the neutral position (of FIGS. 2 and 5). Similarly, when the cam member 164 is rotated in the counter clockwise direction (to the position shown in FIG. 4), the second spring member 176 will urge the guide rod 178 to abut against the rear surface 179 of the cam member 164 at a point vertically below the pin 170 so as to urge rotation of the cam member 164 back toward the neutral position (of FIGS. 2 and 5).

In this configuration, the cam member 164 will abut against the fly line 104 when the cam assembly 160 is in the first position, as shown in FIGS. 2 through 4, such that the fly line 104 is wedged between the cam member 164 and the anvil surface 152 responsive to movement of the fly line 104 in each of two opposite directions (the vertically upward and the vertically downward directions from the perspective of FIGS. 2 through 4) and prevented from traveling through the base unit 118.

More particularly, starting from the position shown in FIG. 2 in which the cam assembly 160 is in the first position closest to the anvil surface 152 and the cam member 164 abuts the fly line 104, if the fly line 104 is pulled in the upward direction, the cam member 164 will rotate in the clockwise direction to the position shown in FIG. 3. The front line bearing surface 172 (FIG. 11) of the cam member 164 will move ever closer to the anvil surface 152 with continued rotation of the cam member 164, causing the fly line 104 to be wedged between the anvil surface 152 and the cam member 164 and preventing further movement of the fly line 104 (i.e., any additional movement other than the minimal movement that might occur as the cam member 164 rotates). It is noted that the rotation of the cam member 164 may urge the cam carriage 162 in the direction away from the anvil surface 152 from the first position toward the second position shown in FIG. 5, but the size of the cam member 164 and the distance of travel between the cam carriage 162 and the fixed frame 150 may be selected and configured such that the cam member 164 cannot completely rotate in a full circle within the cam carriage 162.

Similarly, if the fly line 104 is pulled in the downward direction, the cam member 164 will rotate in the counter-clockwise direction to the position shown in FIG. 4, in which the front line bearing surface 172 (FIG. 11) of the cam member 164 has moved closer to the anvil surface 152 so as to cause the fly line 104 to be wedged between the anvil surface 152 and the cam member 164 and preventing further movement of the fly line 104.

When it is desired to freely travel the fly line 104 through the base unit 118 so as to raise and lower the load 111 attached to the load line 102, the user may ensure that the fly line is not tensioned, and actuate the movable lever 168 so as to move the cam assembly 160 away from the first position and toward the second position. Once the cam assembly 160 is moved to the second position, the springs 174, 176 and guide rods 175, 178 (FIG. 11) may urge the cam member 164 back to the neutral position, as shown in FIG. 5. While the movable lever 168 is actuated and the cam assembly 160 is maintained in the second position, the user may freely pull the fly line 104 through the base unit 118 in the upward and downward directions. It is noted that the spring constants of the springs 174, 176 may be sufficiently low that the cam member 164 will not return to the neutral position even if the movable lever 168 is actuated as long as the fly line 104 remains tensioned. In other words, to unlock the cam member 164, it may be required to actuate the movable lever 168 and remove tension from the fly line 104 (or at least reduce the tension below a threshold level). Thus, accidents that might occur if the movable lever 168 were unintentionally actuated may be avoided.

Referring again to FIG. 11, the cam assembly 160 may include one or more features that may be used to facilitate return of the cam member 164 to the neutral position (shown in FIGS. 2 and 5) in the event the cam member 164 becomes stuck in a rotated position with the fly line 104 wedged between the anvil surface 152 and the cam member 164, as may occur when excessive forces are applied to the fly line 104 while the fly line 104 is locked against the anvil surface 152 by the cam member 164. For example, a shaped feature 196 may be provided on a lateral side surface of the cam member 164 that may be engaged with a wrench or other tool so as to allow a user to employ the wrench or other tool to rotate the cam member 164 back to the neutral position. As a non-limiting example, the shaped feature 196 may comprise a hexagonal-shaped protrusion protruding in the lateral direction from the side surface of the cam member 164. The hexagonal shaped protrusion may be concentric with the pin 170 and the axis of rotation of the cam member 164 such that rotation of the feature 196 with a wrench causes the cam member 164 to rotate about the pin 170. One or more apertures, such as the apertures 190, 191 shown in FIG. 11, may be provided through a wall of the cam carriage 162 to allow access to the feature 196 with the wrench or other tool.

In addition or alternatively, recesses 192, 194 or other features may be formed on rear surfaces of the cam member 164. The recesses 192, 194 may be sized and configured to be engaged with a rod or other tool through the apertures 190, 191 in the cam carriage 162. For example, if the cam member 164 becomes stuck in the rotated position illustrated in FIG. 11, a rod may be inserted through the aperture 190 in the cam carriage 162 and into the recess 192 in the cam member 164. The rod then may be used to push against the cam member 164 so as to cause the cam member 164 to rotate toward the neutral position. A mallet or hammer could be used in conjunction with the rod as needed to dislodge the cam member 164 and return it to the neutral position. If the cam member 164 were lodged in the rotated position shown in FIG. 4, a rod may be inserted through the aperture 191 in the cam carriage 162 and into the recess 194 in the cam member 164 and used to return the cam member 164 to the neutral position.

Although the base unit 118 is shown as being oriented such that the fly line 104 passes through the base unit 118 in the vertical direction in the embodiment of FIGS. 1 through 5, the base unit 118 may also be oriented and configured such that the fly line 104 passes through the base unit 118 in a horizontal direction or any direction other than vertical in additional embodiments.

Components of the lift system 100 shown in FIGS. 1A and 1B may be packed and transported to other locations, such as to other theaters or venues. For example, the container 112 may be configured to receive some or all of the pulleys 106, the line stopper 113, the safety line 117, the base unit 118, the return mechanism 134, the fly line 104, and/or the load line 102. Some pulleys 106 may typically be available on location, so some of the pulleys (e.g., the pulleys 106c, 106d, 106i, and 106j, each connected to the overhead supports 108, 109) may not be carried within the container 112. The removable weights 116 may be removed from the container 112 before transport to save space and weight of the container 112. Typically, removable weights 116 may be available at or near other locations where the lift system 100 is to be used, so expenses associated with transporting removable weights 116 may be avoided. Avoiding excess weight may be particularly desirable for air travel, and omission of the removable weights 116 may keep the container 112 weight within limits that make air travel economically feasible. Thus a production requiring lift capabilities may be performed at venues where built-in systems are not available.

The lift system 100 may be installed at a facility by removing components from the container 112 and routing the fly line 104 adjacent the pulleys 106 as described above. A first point and a second point of the fly line 104 may be fixed in respective fixed locations so as to define a working portion of the fly line 104 between the first point and the second point. Some of the pulleys 106 may be secured to the container 112, and weights may be added to the container 112 to match the weight of the load 111 expected to be lifted by the lift system 100. The base unit 118 may be secured to a floor below the overhead support 108 by weighting the base unit 118 down, securing the base unit 118 to a weighted object, or mechanically securing (e.g., bolting) the base unit 118 to the floor, or to another structure weighted to the floor. The load line 102, line stopper 113, and safety line 117 may be installed as shown in FIG. 1B and previously described herein.

Once the lift system 100 is installed, an operator may lift a load 111 by actuating the movable lever 168 to move the cam assembly 160 away from the anvil surface 152, and pulling the fly line 104 to move the counterweight 110 vertically upward or downward. This moves the load 111, typically in the opposite direction as the direction the counterweight 110 moves.

To make the lift system 100 relatively easier to operate without winches, motors, or other equipment requiring external energy, the mass of the counterweight 110 may be selected to be within approximately 10% of the mass of the load 111 to be lifted in some embodiments, such as within about 5% or even within about 1% of the mass of the load 111 to be lifted. That is, the mass of the counterweight may be between about 90% and 110% of the mass of the load 111, between about 95% and about 105% of the mass of the load 111, or even between about 99% and 101% of the mass of the load 111. A counterweight 110 more closely matched to the load 111 tends to make moving the load 111 with the lift system 100 relatively easier and faster.

The pulleys 106 may be selected to be relatively large to decrease frictional losses in the lift system 100. For example, larger pulleys cause the load line 102 and/or the fly line 104 to form more gradual bends over the sheaves of the pulleys 106, which gradual bends typically correspond with relatively lower friction. Smaller pulleys 106 may also be selected, such as to keep the components small enough to fit within a particular container 112. In some embodiments, the pulleys 106 may have a sheave diameter from about 1 inch (2.54 cm) to about 8 inches (20.3 cm). For example, the pulleys 106 may have a sheave diameter from about 2 inches (5.08 cm) to about 6 inches (15.2 cm). In some embodiments, the pulleys may have a sheave diameter of about 4 inches (10.2 cm). Some of the pulleys 106 may have different sheave diameters from other pulleys.

Figure 12A:
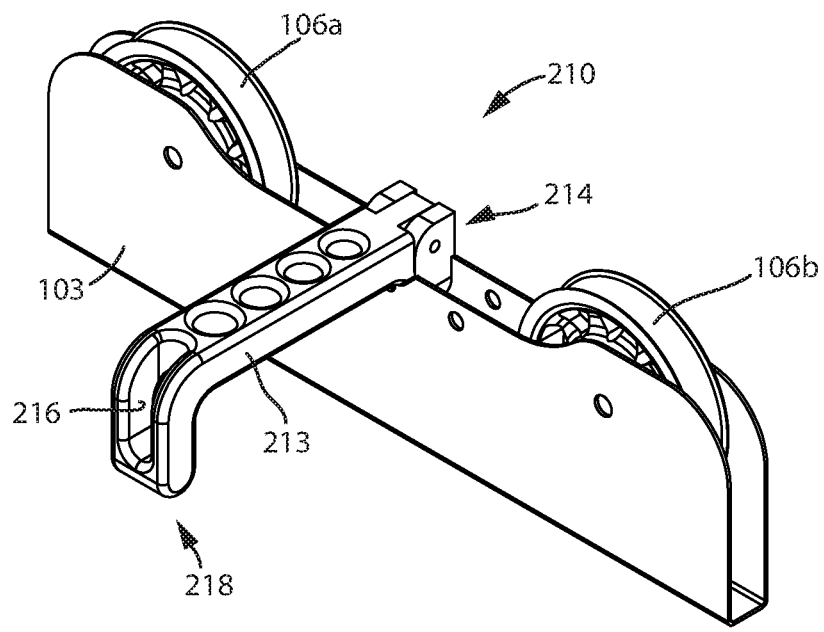
FIGS. 12A and 12B illustrate an example of a yoke assembly that may be employed as part of a lift system according to the present disclosure.
Figure 12B:
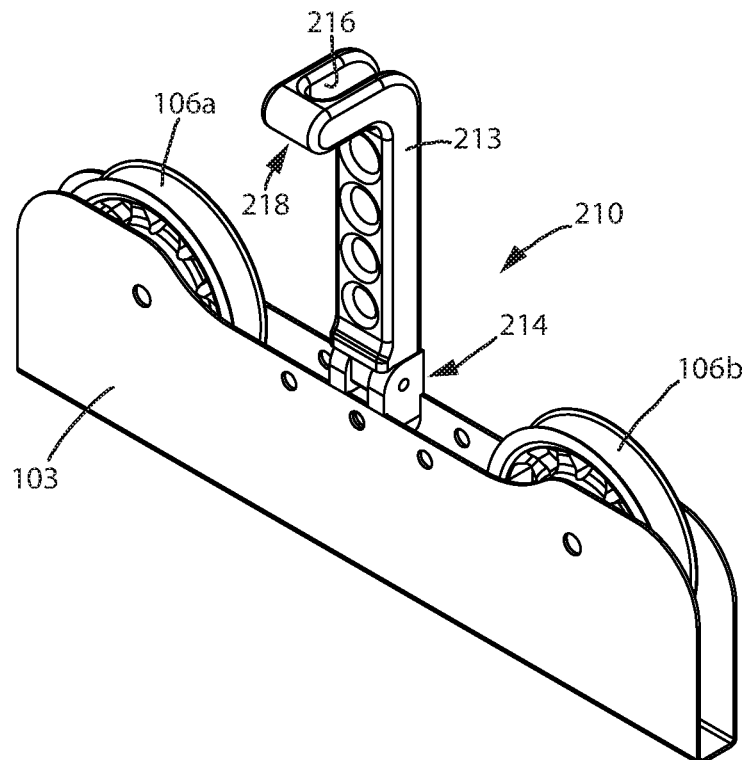

As previously mentioned, in some embodiments, the pulleys 106a, 106b mounted to the top of the counterweight 110 may be attached to a bracket 103, which may be part of a yoke assembly 210 as illustrated in FIGS. 12A and 12B. As shown therein, the yoke assembly 210 includes a bracket 103. The pulley 106a is mounted to the bracket 103 at a first end thereof, and the pulley 106b is mounted to the bracket 103 at an opposite second end thereof. The yoke assembly 210 may comprise an elongated bar that includes an aperture 216 at an end thereof distal to the bracket 103. The apertures 216 may be sized to allow the load line 102 to pass therethrough, but to prevent a line stopper 113 from passing therethrough.

An end of a yoke 213 proximate the bracket 103 is attached to the bracket 103 by a hinge 214, such that the yoke 213 may be rotated back and forth between a horizontal orientation as shown in FIG. 12A and a vertical orientation as shown in FIG. 12B. The length of the yoke 213 may be such that the distal end of the yoke 213 extends to or beyond a lateral side of the counterweight 110 (e.g., to or beyond a lateral side of the container 112). In this configuration, when the fly line 102 is connected to a load 111 and the line stopper 113 is engaged with the yoke 213 during operation of the lift system 100, the load line 102 will pull the yoke 213 into the vertical orientation illustrated in FIG. 12B. As shown therein, the yoke 213 may include an extension 218 projecting from the distal end of the yoke 213 in a direction substantially perpendicular to the length of the yoke 213, such that the extension is oriented horizontally when the yoke 213 is in the vertical position. This allows the load line 102 to pass vertically through the yoke 213 in a straight manner during use, without requiring the load line 102 to bend as it passes through the yoke 213, which may decrease strain and wear on the load line 102.

Upon disassembly of the lift system 100 or other retraction from of the load line 102 from the counterweight when a load 111 is not coupled to the load line 102, the yoke 213 will fall to the horizontal orientation shown in FIG. 12A, and the load line 102 can be pulled through the yoke 213 with decreased bends (as the yoke 213 will maintain the load line 102 to the lateral side of the counterweight 110) and reduced friction.

The lift system 100 described herein may be used to lift a human, such as an actor on stage, or any other object. The lift system 100 may be configured to be operated without utilities such as electrical power or compressed air, and the operator may be able to safely raise and lower much more weight than he could lift with conventional systems, and may be able to raise and lower loads 111 faster than with conventional systems. The cam assembly 160, which may be configured to lock the fly line 104 except when the operator actuates the movable lever 168, as well as the line stopper 113, may help prevent accidental slippage of the fly line 104 and dropping the load 111.

Though described in conjunction with a stage and theatrical productions, the lift system 100 and methods described herein may be used in any situation requiring the ability to safely lift a load 111. For example, the lift system 100 may be used for building maintenance, construction, search-and-rescue operations, recreation, etc. The lift system 100 may be particularly useful in locations where lifting is needed on occasion, but not often enough to justify a permanently installed lift system. The lift system may also be beneficial where utilities to operate motors or winches are not readily available.

Additional non limiting example embodiments of the disclosure are described below.

Embodiment 1

A lift system, comprising: an overhead support comprising at least a first pulley and a second pulley; a counterweight comprising at least an upper pulley; a load line passing around the first pulley of the overhead support and connected to a load having a weight on one side of the first pulley and connected to the counterweight on another side of the first pulley; a base unit comprising a fixed frame having an anvil surface, a first guide member and a second guide member each coupled to the fixed frame, and a cam assembly coupled to the fixed frame, the cam assembly movable relative to the fixed frame between a first position and a second position, the cam assembly including a cam carriage and a cam member, the cam member rotatable relative to the cam carriage; a fly line having a first fixed point and a second fixed point, a working portion of the fly line between the first fixed point and the second fixed point extending around the upper pulley of the counterweight and around the second pulley of the overhead support, a first section of the working portion of the fly line on a first side of the second pulley of the overhead support suspending the counterweight above ground, a second section of the working portion of the fly line on a second side of the second pulley of the overhead support extending through the base unit between the first guide member and the second guide member and adjacent the cam assembly; wherein the cam member abuts against the fly line when the cam assembly is in the first position such that the fly line is wedged between the cam member and the anvil surface responsive to movement of the fly line in each of the two opposite directions and prevented from traveling through the base unit; and wherein the fly line may be freely pulled in each of two opposite directions and caused to travel through the base unit by an operator to change an elevation of the counterweight above ground and a corresponding position of the load when the cam assembly is in the second position.

Embodiment 2

The lift system of Embodiment 1, wherein the base unit further comprises a spring biasing the cam assembly toward the first position.

Embodiment 3

The lift system of Embodiment 2, wherein the base unit further comprises a movable lever configured to move the cam assembly from the first position to the second position.

Embodiment 4

The lift system of Embodiment 3, wherein the movable lever comprises a foot pedal.

Embodiment 5

The lift system of Embodiment 4, wherein the base unit is attached to a floor.

Embodiment 6

The lift system of Embodiment 1, wherein cam member is mounted to the cam carriage on a pin, the cam member configured to rotate on the pin, the cam member having a front line bearing surface configured to bear against the fly line when the cam assembly is in the first position.

Embodiment 7

The lift system of Embodiment 6, wherein the line bearing surface of the cam member is curved and has a point or section at which a distance between the line bearing surface and the pin is a minimum, the distance between the line bearing surface and the pin increasing in each of opposite directions moving away from the point or section at which the distance between the line bearing surface and the pin is the minimum.

Embodiment 8

The lift system of Embodiment 7, wherein the cam member is symmetrical about a plane extending longitudinally through the pin and transversely through the cam member and intersecting the point or section of the line bearing surface of the cam member at which the distance between the line bearing surface and the pin is the minimum.

Embodiment 9

The lift system of Embodiment 7, wherein the cam assembly further comprises at least one spring member configured to bias the cam member to a neutral position at which a line perpendicular to the anvil surface and extending through the pin intersects the point or section of the line bearing surface of the cam member at which the distance between the line bearing surface and the pin is the minimum.

Embodiment 10

The lift system of Embodiment 9, wherein the at least one spring member comprises a first spring member and a second spring member each configured to contact a rear surface of the cam member on a side of the cam member opposite the front line bearing surface, the first spring member and the second spring member disposed on opposing sides of the pin.

Embodiment 11

The lift system of Embodiment 1, wherein the cam assembly is configured to pivot relative to the fixed frame between the first position and the second position.

Embodiment 12

The lift system of Embodiment 1, wherein the cam assembly is configured to slide in a linear direction relative to the fixed frame between the first position and the second position.

Embodiment 13

A method of installing a lift system, comprising: passing a load line around a first pulley of an overhead support and connecting the load line to a load having a weight on one side of the first pulley and connecting the load line to a counterweight on another side of the first pulley; passing a fly line around an upper pulley attached to the counterweight, around a second pulley of the overhead support, and through a base unit, the base unit comprising a fixed frame having an anvil surface, a first guide member and a second guide member each coupled to the fixed frame, and a cam assembly coupled to the fixed frame, the cam assembly movable relative to the fixed frame between a first position and a second position, the cam assembly including a cam carriage and a cam member, the cam member rotatable relative to the cam carriage; fixing a first point and a second point of the fly line in respective fixed locations so as to define a working portion of the fly line between the first point and the second point, a first section of the working portion of the fly line disposed on a first side of the second pulley of the overhead support and suspending the counterweight above ground, a second section of the working portion of the fly line disposed on a second side of the second pulley of the overhead support and extending through the base unit between the first guide member and the second guide member and adjacent the cam assembly; wherein the cam member of the base unit abuts against the fly line when the cam assembly is in the first position such that the fly line is wedged between the cam member and the anvil surface responsive to movement of the fly line in each of the two opposite directions and prevented from traveling through the base unit; and wherein the fly line may be freely pulled in each of two opposite directions and caused to travel through the base unit by an operator to change an elevation of the counterweight above ground and a corresponding position of the load when the cam assembly is in the second position.

Embodiment 14

The method of Embodiment 13, further comprising biasing the cam assembly toward the first position.

Embodiment 15

The method of Embodiment 14, further comprising providing a lever for moving the cam assembly from the first position to the second position.

Embodiment 16

The method of Embodiment 13, further comprising attaching the base unit to a floor.

Embodiment 17

The method of Embodiment 13, wherein cam member is mounted to the cam carriage on a pin, the cam member configured to rotate on the pin, the cam member having a front line bearing surface configured to bear against the fly line when the cam assembly is in the first position.

Embodiment 18

The method of Embodiment 17, wherein the line bearing surface of the cam member is curved and has a point or section at which a distance between the line bearing surface and the pin is a minimum, the distance between the line bearing surface and the pin increasing in each of opposite directions moving away from the point or section at which the distance between the line bearing surface and the pin is the minimum.

Embodiment 19

The method of Embodiment 18, further comprising biasing the cam member to a neutral position at which a line perpendicular to the anvil surface and extending through the pin intersects the point or section of the line bearing surface of the cam member at which the distance between the line bearing surface and the pin is the minimum.

Embodiment 20

The method of Embodiment 19, wherein biasing the cam member comprises biasing the cam member with a first spring member and a second spring member each configured to contact a rear surface of the cam member on a side of the cam member opposite the front line bearing surface, the first spring member and the second spring member disposed on opposing sides of the pin.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various lift types and configurations.

What is claimed is:

1. A lift system, comprising:
an overhead support comprising at least a first pulley and a second pulley;
a counterweight comprising at least an upper pulley;
a load line passing around the first pulley of the overhead support and connected to a load having a weight on one side of the first pulley and connected to the counterweight on another side of the first pulley;
a base unit comprising a fixed frame having an anvil surface, a first guide member and a second guide member each coupled to the fixed frame, and a cam assembly coupled to the fixed frame, the cam assembly movable relative to the fixed frame between a first position and a second position, the cam assembly including a cam carriage and a cam member, the cam member rotatable relative to the cam carriage;
a fly line having a first fixed point and a second fixed point, a working portion of the fly line between the first fixed point and the second fixed point extending around the upper pulley of the counterweight and around the second pulley of the overhead support, a first section of the working portion of the fly line on a first side of the second pulley of the overhead support suspending the counterweight above ground, a second section of the working portion of the fly line on a second side of the second pulley of the overhead support extending through the base unit between the first guide member and the second guide member and adjacent the cam assembly;
wherein the cam member abuts against the fly line when the cam assembly is in the first position such that the fly line is wedged between the cam member and the anvil surface responsive to movement of the fly line in each of the two opposite directions and prevented from traveling through the base unit; and
wherein the fly line may be freely pulled in each of two opposite directions and caused to travel through the base unit by an operator to change an elevation of the counterweight above ground and a corresponding position of the load when the cam assembly is in the second position.

2. The lift system of claim 1, wherein the base unit further comprises a spring biasing the cam assembly toward the first position.

3. The lift system of claim 2, wherein the base unit further comprises a movable lever configured to move the cam assembly from the first position to the second position.

4. The lift system of claim 3, wherein the movable lever comprises a foot pedal.

5. The lift system of claim 4, wherein the base unit is attached to a floor.

6. The lift system of claim 1, wherein cam member is mounted to the cam carriage on a pin, the cam member configured to rotate on the pin, the cam member having a front line bearing surface configured to bear against the fly line when the cam assembly is in the first position.

7. The lift system of claim 6, wherein the line bearing surface of the cam member is curved and has a point or section at which a distance between the line bearing surface and the pin is a minimum, the distance between the line bearing surface and the pin increasing in each of opposite directions moving away from the point or section at which the distance between the line bearing surface and the pin is the minimum.

8. The lift system of claim 7, wherein the cam member is symmetrical about a plane extending longitudinally through the pin and transversely through the cam member and intersecting the point or section of the line bearing surface of the cam member at which the distance between the line bearing surface and the pin is the minimum.

9. The lift system of claim 7, wherein the cam assembly further comprises at least one spring member configured to bias the cam member to a neutral position at which a line perpendicular to the anvil surface and extending through the pin intersects the point or section of the line bearing surface of the cam member at which the distance between the line bearing surface and the pin is the minimum.

10. The lift system of claim 9, wherein the at least one spring member comprises a first spring member and a second spring member each configured to contact a rear surface of the cam member on a side of the cam member opposite the front line bearing surface, the first spring member and the second spring member disposed on opposing sides of the pin.

11. The lift system of claim 1, wherein the cam assembly is configured to pivot relative to the fixed frame between the first position and the second position.

12. The lift system of claim 1, wherein the cam assembly is configured to slide in a linear direction relative to the fixed frame between the first position and the second position.

13. A method of installing a lift system, comprising:
passing a load line around a first pulley of an overhead support and connecting the load line to a load having a weight on one side of the first pulley and connecting the load line to a counterweight on another side of the first pulley;
passing a fly line around an upper pulley attached to the counterweight, around a second pulley of the overhead support, and through a base unit, the base unit comprising a fixed frame having an anvil surface, a first guide member and a second guide member each coupled to the fixed frame, and a cam assembly coupled to the fixed frame, the cam assembly movable relative to the fixed frame between a first position and a second position, the cam assembly including a cam carriage and a cam member, the cam member rotatable relative to the cam carriage;
fixing a first point and a second point of the fly line in respective fixed locations so as to define a working portion of the fly line between the first point and the second point, a first section of the working portion of the fly line disposed on a first side of the second pulley of the overhead support and suspending the counterweight above ground, a second section of the working portion of the fly line disposed on a second side of the second pulley of the overhead support and extending through the base unit between the first guide member and the second guide member and adjacent the cam assembly;
wherein the cam member of the base unit abuts against the fly line when the cam assembly is in the first position such that the fly line is wedged between the cam member and the anvil surface responsive to movement of the fly line in each of the two opposite directions and prevented from traveling through the base unit; and
wherein the fly line may be freely pulled in each of two opposite directions and caused to travel through the base unit by an operator to change an elevation of the counterweight above ground and a corresponding position of the load when the cam assembly is in the second position.

14. The method of claim 13, further comprising biasing the cam assembly toward the first position.

15. The method of claim 14, further comprising providing a lever for moving the cam assembly from the first position to the second position.

16. The method of claim 13, further comprising attaching the base unit to a floor.

17. The method of claim 13, wherein cam member is mounted to the cam carriage on a pin, the cam member configured to rotate on the pin, the cam member having a front line bearing surface configured to bear against the fly line when the cam assembly is in the first position.

18. The method of claim 17, wherein the line bearing surface of the cam member is curved and has a point or section at which a distance between the line bearing surface and the pin is a minimum, the distance between the line bearing surface and the pin increasing in each of opposite directions moving away from the point or section at which the distance between the line bearing surface and the pin is the minimum.

19. The method of claim 18, further comprising biasing the cam member to a neutral position at which a line perpendicular to the anvil surface and extending through the pin intersects the point or section of the line bearing surface of the cam member at which the distance between the line bearing surface and the pin is the minimum.

20. The method of claim 19, wherein biasing the cam member comprises biasing the cam member with a first spring member and a second spring member each configured to contact a rear surface of the cam member on a side of the cam member opposite the front line bearing surface, the first spring member and the second spring member disposed on opposing sides of the pin.

* * * * *